United States Patent [19]

Kato et al.

[11] Patent Number: 5,225,264

[45] Date of Patent: Jul. 6, 1993

[54] COMPOSITE MOLDED ARTICLE

[75] Inventors: Nobuji Kato; Hisayoshi Ohsumi, both of Hamamatsu, Japan

[73] Assignee: Yamaha Corporation, Hamamatsu, Japan

[21] Appl. No.: 623,114

[22] Filed: Dec. 6, 1990

[30] Foreign Application Priority Data

Dec. 7, 1989 [JP] Japan .................................. 1-318279
Sep. 25, 1990 [JP] Japan .................................. 2-254609

[51] Int. Cl.$^5$ ......................... B32B 3/10; B32B 21/04
[52] U.S. Cl. ................................... 428/137; 428/106;
428/138; 428/161; 428/215; 428/425.1;
428/479.6; 428/464; 428/511; 428/537.1;
428/539.5; 428/541; 428/542.2; 428/913.3;
428/481
[58] Field of Search ............... 428/47, 48, 131, 126,
428/137, 109, 110, 213, 212, 215, 156, 161, 172,
166, 537.1, 541, 539.5, 913.3, 479.3, 425.1,
479.6, 464, 511, 542.2, 120, 138, 318.4, 481;
52/242, 282, 288

[56] References Cited

U.S. PATENT DOCUMENTS

| | | | |
|---|---|---|---|
| 1,900,824 | 3/1933 | Lewis | 428/106 |
| 1,921,164 | 8/1933 | Lewis | 428/106 |
| 3,503,831 | 3/1970 | Oyama | 428/332 |
| 3,870,594 | 3/1975 | Kudo | 428/220 |
| 3,960,639 | 6/1976 | Kudo | 156/222 |
| 4,337,682 | 7/1982 | Schwichtenberg | 84/193 |
| 4,543,284 | 9/1985 | Baum | 428/106 |
| 4,689,257 | 8/1987 | Baum | 428/106 |

FOREIGN PATENT DOCUMENTS 2050245 1/1981 United Kingdom .

OTHER PUBLICATIONS

World Patents Index Latest, Week 8126, Derwent Publications, Ltd. AN 81-46823D and JP-A 56-053073, May 12, 1981.

Primary Examiner—Donald J. Loney
Attorney, Agent, or Firm—Burns, Doane, Swecker & Mathis

[57] ABSTRACT

A composite molded article comprising a layer 5 made of a synthetic resin on which is laminated a surface material 1 having a construction such that wood veneers 3 and 4 are laminated on the surfaces of a metal sheet 2. A method for molding a composite molded article comprises the steps of: arranging, in a metal mold 7 for molding, a surface material 1 which has a construction such that wood veneers 3 and 4 are laminated on each surface of a metal sheet 2; and molding a synthetic resin 5 on a backside of the surface material 1 to integrate the surface material 1 with the synthetic resin 5.

6 Claims, 2 Drawing Sheets

COMPOSITE MOLDED ARTICLE

BACKGROUND OF THE INVENTION

The present invention relates to composite molded articles composed of a wood veneer and a synthetic resin molded product and a method for manufacturing the same.

Synthetic resin molded products having grain pattern have been used widely in interiors of cars, furniture, electric devices.

The following have been hitherto been provided as the composite molded articles having a grain pattern (1) Those produced by an insertion molding method in which a surface material backed with sliced veneer, wood veneer, plywood, unwoven fabric or the like is placed in a metal mold for injection molding and a synthetic resin is injected onto the backside thereof.

(2) Those produced by subjecting a synthetic resin molded product to surface treating as by sanding, chlorination or the like to increase adhesiveness, coating an adhesive, and pressing thereon the above-described surface material.

The composite molded articles described in (1) and (2) above have a good designability. However, the composite molded articles tend to give rise to rejected products which have caused cracks in the wood veneer or the like that is present on its surface when they have complicated shapes. In order to avoid this, attempts have been made to prefabricating surface materials as by vacuum molding prior to use. However, this countermeasure has been ineffective because the wood veneer or the like causes cracks in the step of the prefabricating.

In particular, those produced by using an adhesive as described in (2) above tend to suffer from the occurrence of protrusion of the adhesive, stain, slipping out upon the bonding or the like. Also, they have a defect that it takes a long time to set the adhesive upon the production.

Furthermore, when surface finishing is conducted by buffing after coating the surface of the composite molded articles, the synthetic resin provided on the backside softens at the interface between it and the surface material due to frictional heat upon the buffing, thus forming minute depressions and protrusions on the surface of the molded surface. Therefore, buffing cannot be adopted for the surface finishing of the composite molded articles described in (a) and (2) above, and mirror surface finishing by spraying up or matt finishing has had to be adopted.

SUMMARY OF THE INVENTION

It is a first object of the present invention to provide a composite molded article which does not cause cracking of wood veneer when the wood veneer is arranged in a metal mold for injection molding and insertion molding with a synthetic resin is conducted as well as a method for manufacturing such molded product.

It is a second object of the present invention to provide a composite molded article which does not show depression and protrusion pattern on the surface thereof even when buffed, that is, which does not suffer from the spoiling of the appearance despite the buffing as well as a method for manufacturing such molded product.

The molded product of the present invention includes a layer of a synthetic resin on which a surface material is laminated, the surface material having a construction such that wood veneer is laminated on each surface of a metal sheet.

In the method for manufacturing a composite molded article, a surface material which has a construction such that wood veneer is laminated on each surface of a metal sheet is arranged in a metal mold for molding, then a synthetic resin is molded on the backside of the surface material to integrate the surface material and the synthetic resin.

Because of the above-described construction, damages of the wood veneer on the surface is prevented by reinforcement by the metal sheet even when the surface material is deformed greatly upon the molding.

Even though the synthetic resin is softened at the interface between the surface material and the synthetic resin due to frictional heat upon the buffing of the composite molded article, the provision of the metal sheet prevents the occurrence of minute depressions and protrusions on the front surface of the surface material.

BRIEF DRAWING OF THE DRAWINGS

FIG. 4 is a view illustrating the arrangement of the surface material between the metal mold halves for prefabricating;

FIG. 5 is a longitudinal cross section of the surface material molded in the metal mold for prefabricating;

FIG. 6 is a view illustrating the surface material inserted in the metal mold for injection molding;

FIG. 7 is a cross section of the composite molded article coated after the injection molding;

Figure 8:
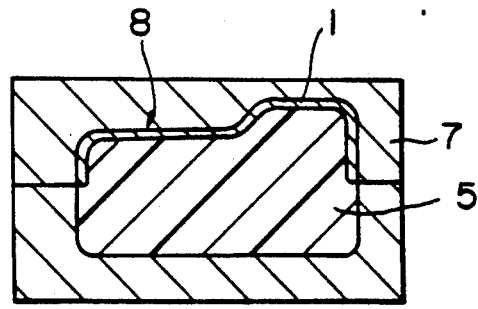
Figure 9:
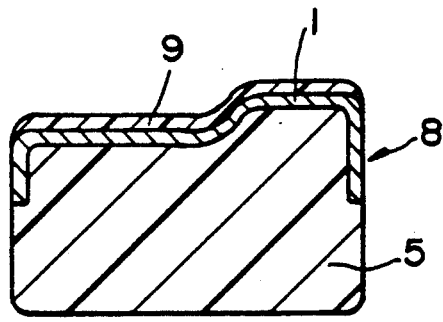
Figure 7:
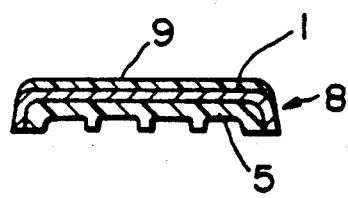

FIGS. 8 and 9 illustrate an embodiment in which a non-shaped surface material is directly inserted between the metal mold halves for injection molding to produce a composite molded article, and FIG. 8 is a longitudinal cross section of the surface material in a deformed state after inserting the surface material in the metal mold injection molding and injecting a synthetic resin; and FIG. 9 is a longitudinal cross section of a composite molded article coated after the injection molding.

DESCRIPTION OF PREFERRED ENBODIMENT

Detailed Description of the Preferred Embodiments

Figure 1:
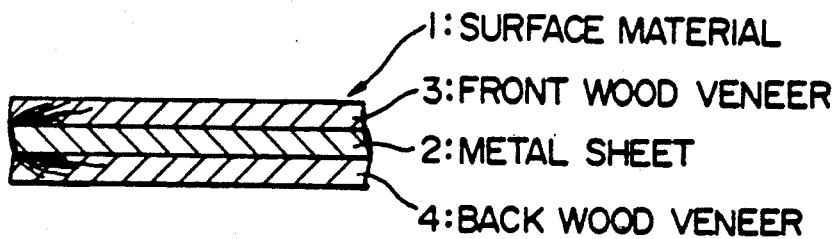
FIG. 1 is a longitudinal cross section of an example of the surface material which is used in the present invention.

FIG. 1 is a longitudinal cross section of an example of a surface material 1 which is used in the present invention. In FIG. 1, reference numeral 2 denotes a metal sheet. On the surfaces of the metal sheet 2 are integrally bonded a front wood veneer (hereafter, referred to "front veneer") 3 and a back wood veneer (hereafter, referred to "back veneer") 4 with an adhesive, thus forming the surface material having three layers.

If desired, the surface of the metal sheet 2 may be subjected to chemical pretreatment or oxidative pretreatment in order to increase its corrosion resistance, adhesion strength and the like.

The metal sheet 2 must be flexible and strong enough to reinforce the front veneer 3 and the back veneer 4.

As for the material for the metal sheet 2, there can be used suitably aluminium, aluminium alloys, magnesium, magnesium alloys, titanium, titanium alloys, copper, copper alloys, iron, iron alloys, brass, stainless steel or the like.

The thickness of the metal sheet 2 is set up depending on the kind of metal used. For example, when an aluminium sheet is used as the metal sheet 2, its thickness is preferably from 0.01 to 0.5 mm, and particularly from 0.05 to 0.3 mm. If its thickness is smaller than 0.01 mm, reinforcement effect cannot be obtained when sandwiching it. On the other hand, if its thickness is larger than 0.5 mm, the rigidity becomes too high. However, the thickness happens to be set up so as to exceed the above-described value, if desired.

The same material may be used for both the front veneer 3 and the back veneer 4. However, it is preferred to use a material which has beautiful grain pattern for the front veneer 3. The front veneer 3 and the back veneer 4, respectively, have a thickness of preferably from 0.15 to 0.5 mm, particularly about 0.2 mm. If their thickness is smaller than 0.15 mm, there arises a difficulty on the strength and if the thickness exceeds 0.5 mm, their shape follow-up capability decreases.

In addition, the use of alkali treated veneer for the front veneer 3 and the back veneer 4 increases their shape follow-up capability toward deformation because a known alkali treatment with sodium hydroxide, potassium hydroxide or the like applied to veneer increases the softness of the veneer, thus making it possible to cope with more complicated molded products.

The front veneer 3, the back veneer 4 and the metal sheet 2 are made integral with each other with an adhesive to form the surface material 1. There is no limitation on the kind of the adhesive to be used. However, as described later, it is preferred to effect the bonding under pressure with heating using a heat resistant thermosetting adhesive so that the surface material 1 is durable upon inserting the surface material in a metal mold 7 for injection molding and molding the synthetic resin.

The surface material 1 will not be broken when it is used in composite molded articles having complicated shapes because the front veneer 3 is reinforced with the metal sheet 2. Therefore, composite molded articles with beautiful grain patterns can be obtained using the surface material 1.

Because the surface material 1 thus obtained has a three-layer structure which is composed of the front veneer 3 and the back veneer 4 integrally bonded onto the front and back surfaces of the metal sheet, respectively, the forces applied on the both surfaces are balanced therebetween. Therefore, the surface material 1 will not curl in a cylindrical form but will retain its flat plate form after being manufactured by heat bonding and cooled to room temperature, which makes it easy to use them.

That is, a two-layer surface material which is composed of a metal sheet and a front veneer curls when produced by thermosetting due to difference in coefficient of thermal expansion between the two materials and thus it is difficult to handle it. Therefore, for the surface materials having a two-layer construction, it is necessary to decrease its thickness or use adhesives for cold pressing or adhesives to be used in a medium temperature range of no higher than about 80° C. As a result, strict limitations are posed on the conditions of molding upon injection molding, and therefore only composite molded articles having low heat resistance can be obtained. Therefore, surface materials having a two-layer construction are unsuitable.

On the contrary, the surface material having a three-layer construction used in the present invention does not suffer from the problems as encountered in the case of the surface material having a two-layer construction.

Figure 4:
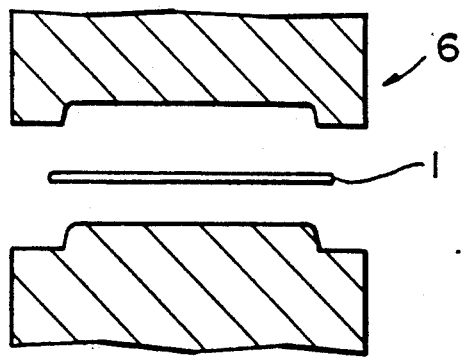
FIGS. 4 to 7 illustrate an embodiment in which the surface material is molded in a metal mold for prefabricating beforehand and the resulting surface material is inserted in a metal mold for injection molding to produce a composite molded article.
Figure 5:
Figure 6:
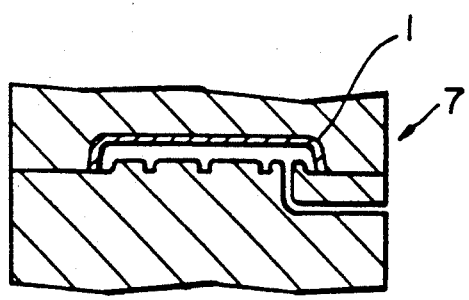

In order to manufacture composite molded articles using the surface material 1 having the above-described three-layer construction, at first the surface material 1 is arranged in a metal mold 6 for prefabricating as illustrated in FIG. 4, and press-molded. Then, the surface material 1 is deformed to have a shape as illustrated in FIG. 5. Next, this is inserted in a metal mold 7 for injection molding as illustrated in FIG. 6, and a synthetic resin 5 is injection molded on the backside thereof to obtain a composite molded article 8 composed of the surface material 1 and the synthetic resin 5 made integral with each other.

As another method for manufacturing a composite molded article using the above-described surface material 1, a method can be adopted in which the surface material 1 cut to a suitable size, if desired, is arranged in the metal mold for injection molding and the synthetic resin 5 is injected thereon to deform the surface material 1 and make integral the surface material 1 with the resin 5 to form the composite molded article as illustrated in FIGS. 8 and 9.

Figure 2:
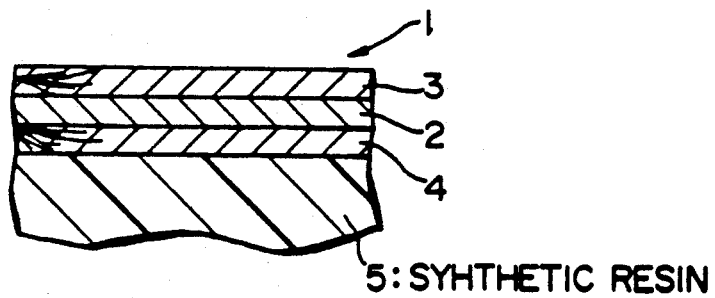
FIG. 2 is a cross section of a portion close to the surface of the composite molded article of the present invention.
Figure 3:
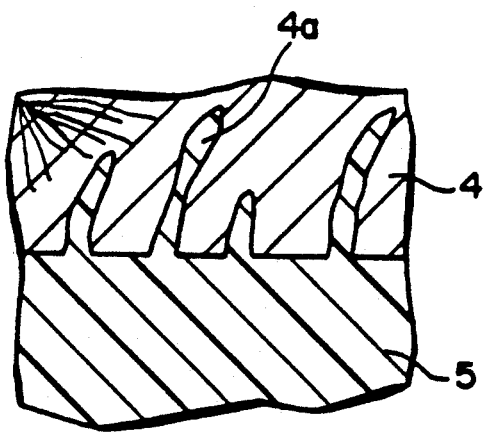
FIG. 3 is a an enlarged cross section of a portion of junction between the backing wood veneer and the synthetic resin.

When the insertion molding is effected as described above, the synthetic resin 5 contacts the back veneer 4 as illustrated in FIG. 2. In this case, the resin 5 penetrates in small holes 4a present in the back veneer 4 to exhibit an anchoring effect as illustrated in FIG. 3. As a result, the surface material 1 and the synthetic resin 5 are connected to each other firmly without using adhesives.

As described above, because the surface material 1 and the synthetic resin 5 in the composite molded article 8 are connected to each other due to the anchoring effect, they will not peel off from each other.

In the case where a coating 9 is applied on the surface of the surface material 1 of the composite molded article thus obtained and the surface is buffed to effect mirror surface finishing, the movement of the synthetic resin 5 can be prevented from appearing on the surface because of the metal sheet 2 in the surface material 1 even if the synthetic resin softens at the interface between the surface material 1 and the synthetic resin 5 due to heat which generates upon the buffing. Therefore, the composite molded article will not suffer from the occurrence of depression and protrusion patterns upon the surface.

Furthermore, in the composite molded article of the present invention, the deterioration of the back veneer 5 due to moisture can be prevented because the permeation of moisture is interrupted due to the provision of the metal sheet 2. Therefore, the composite molded material of the present invention has a good moisture resistance and exhibits an excellent durability.

EXAMPLES

Hereafter, the present invention will be described concretely with reference to examples using an aluminium sheet as the metal sheet 2.

EXAMPLE 1

On both surfaces of a metal sheet 2 made of aluminium having a thickness of 0.1 mm subjected to a chemical pretreatment with phosphoric acid-chromic acid were bonded integrally the front veneer 3 and the back veneer 4 each made of a walnut veneer having a thickness of 0.2 mm with an adhesive to make the surface material 1 having a three-layer construction.

In this case, the bonding was carried out using a cross-linking type urethane dispersion adhesive (produced by Asahi Denka Co., Ltd.) in a coating amount of 100 g/m$^2$ at a temperature of 150° C. and at a pressure of 10 kg/cm$^2$ for 3 minutes. The surface material 1 did not curl to a cylindrical form because the front and back surfaces were symmetrical, and thus it was easy to handle.

The surface material 1 was cut to a predetermined shape and set in a metal mold 6 for prefabrication, and press molded. The thus molded surface material 1 was inserted in a metal mold 7 for injection molding and an ABS resin was injected thereon to make a composite molded article 8. The surface material 1 and the synthetic resin 5 in the composite molded product thus obtained were made integral firmly.

After applying a coating 9 composed of a stained coat, a prime coat, an undercoat and a top coat on its surface, the composite molded article was buffed to carry out mirror surface finishing. The buffed surface was smooth. The occurrence of minute depressions and protrusions was not observed.

The durability of the composite molded article 8 was examined by retaining it in a moisture resistance tester under the conditions of a temperature: 50° C. and humidity: 95%. As a result, it was revealed that the composite molded article 8 had a moisture resistance much improved as compared with the conventional ones.

EXAMPLE 2

A surface material 1 was made in the same manner as in Example 1 except that a metal sheet 2 made of aluminium having a thickness of 0.15 mm subjected to chemical pretreatment with phosphoric acid-chromic acid was bonded with an phenol butyral sheet adhesive (Aika Co., Ltd.) as an adhesive under the conditions of 140° C., 20 kg/cm$^2$ and 10 minutes. A composite molded article 8 was made using the surface material 1 thus obtained and tested. As a result, it was found that it was a composite molded article as excellent as that obtained in Example 1.

EXAMPLE 3

A surface material 1 was made in the same manner as in Example 1 except that the front veneer 3 and the back veneer 4 were soaked in an aqueous solution of 15 wt. % NaOH for 16 hours.

Upon examination of minimum bend radius of the surface material 1 and of the surface material 1 using the front veneer 3 and the back veneer 4 which were not subjected to the alkali treatment described in Example 1, the values shown in Table 1 were obtained.

TABLE 1

| Surface Material | Minimum Bend Radius (mm) |
|---|---|
| Example 1 | 3 |
| Example 3 | 1.5 |

In addition, a composite molded article 8 was made in the same manner as in Example 1 using the surface material 1, and the composite molded article 8 was subjected to similar test to that in Example. Then, similar results to those obtained in Example 1 were obtained.

What is claimed is:

1. A composite molded article comprising a layer made of a synthetic resin and a surface material laminated on said layer of said synthetic resin, said surface material including a wood veneer and a metal sheet, said wood veneer being laminated on each surface of said metal sheet and further including small holes formed on a backside of said surface material, said small holes containing therein said synthetic resin, thus integrating said surface material with said layer made of said synthetic resin.

2. A composite molded article comprising a layer made of a synthetic resin and a surface material laminated on said layer of said synthetic resin, said surface material including a wood veneer and a metal sheet, said wood veneer being pretreated with an alkali and laminated on each surface of said metal sheet.

3. The composite molded article as claimed in claim 2, wherein said metal sheet is selected from aluminum, aluminum alloys, magnesium, magnesium alloys, titanium, titanium alloys, copper, copper alloys, iron, iron alloys, brass or stainless steel.

4. The composite molded article as claimed in claim 3, wherein said metal sheet is an aluminium sheet having a thickness of from 0.01 to 0.5 mm.

5. The composite molded article as claimed in claim 2, wherein said metal sheet has a different wood veneer laminated on each surface thereof.

6. The composite molded article as claimed in claim 2, wherein said wood veneer has a thickness of from 0.15 to 0.5 mm.

* * * * *